United States Patent
Conlon et al.

(10) Patent No.: US 10,920,859 B2
(45) Date of Patent: Feb. 16, 2021

(54) TWO-SPEED ELECTRIC DRIVE-UNIT

(71) Applicant: GM GLOBAL TECHNOLOGY OPERATIONS LLC, Detroit, MI (US)

(72) Inventors: Brendan M. Conlon, Rochester Hills, MI (US); Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/511,434

(22) Filed: Jul. 15, 2019

(65) Prior Publication Data
US 2021/0018069 A1    Jan. 21, 2021

(51) Int. Cl.
| | |
|---|---|
| F16H 3/66 | (2006.01) |
| F16H 3/76 | (2006.01) |
| F16H 3/72 | (2006.01) |
| B60K 6/365 | (2007.10) |
| B60K 1/00 | (2006.01) |
| B60K 7/00 | (2006.01) |

(52) U.S. Cl.
CPC .............. *F16H 3/66* (2013.01); *F16H 3/725* (2013.01); *F16H 3/76* (2013.01); *B60K 6/365* (2013.01); *B60K 2001/001* (2013.01); *B60K 2007/0038* (2013.01); *B60K 2007/0092* (2013.01); *F16H 2720/04* (2013.01)

(58) Field of Classification Search
None
See application file for complete search history.

(56) References Cited

U.S. PATENT DOCUMENTS

| | | | |
|---|---|---|---|
| 9,855,830 B2* | 1/2018 | Knoblauch | B60K 1/00 |
| 2014/0323259 A1* | 10/2014 | Sugiyama | B60K 17/12 |
| | | | 475/150 |
| 2015/0192192 A1* | 7/2015 | Honda | B60K 6/445 |
| | | | 475/10 |
| 2017/0136870 A1* | 5/2017 | Littlefield | B60K 1/00 |
| 2018/0216713 A1* | 8/2018 | LaForce | B60K 7/0007 |
| 2020/0141477 A1* | 5/2020 | Sullivan | F16H 48/36 |

* cited by examiner

*Primary Examiner* — Justin Holmes
(74) *Attorney, Agent, or Firm* — Quinn IP Law

(57) ABSTRACT

An electric drive-unit encased in a housing includes an electric motor, a first output member, and a second output member. The drive-unit also includes first, second, and third planetary gear-sets, each having first, second, and third nodes. The first gear-set has one node connected to the electric motor. The second gear-set has one node connected to the first planetary gear-set, another node connected to the first output member, and the remaining node fixed to the housing. The third gear-set has one node connected to the first gear-set and another node connected to the second output member. The drive-unit additionally includes a first torque-transmitting device configured to selectively connect one third gear-set node to the housing to thereby affect a first speed-ratio. Furthermore, the drive-unit includes a second torque-transmitting device configured to selectively connect one first gear-set node to one of the third gear-set nodes to thereby affect a second speed-ratio.

20 Claims, 5 Drawing Sheets

TWO-SPEED ELECTRIC DRIVE-UNIT

INTRODUCTION

The disclosure relates to a two-speed electric drive-unit for a motor vehicle.

Modern motor vehicles are typically configured as either two-wheel-drive, i.e., using a single drive-axle, or as having multiple drive-axles. Either type of a vehicle may employ a conventional powertrain, where a single engine is used to propel the vehicle, an electric powertrain, where an electric motor is used to propel the vehicle, or a hybrid powertrain, where two or more distinct power sources, such as an internal combustion engine and an electric motor, are used to accomplish the same task.

A motor vehicle may employ a single or multiple drive-axles for transferring power source torque to drive wheels. A multiple drive-axle motor vehicle may have an axle-split configuration. In such a vehicle, independent power-sources, such as an internal combustion engine and an electric motor, are set up to independently power individual vehicle drive-axles that are operatively connected to the respective power-sources, thus generating on-demand multiple drive-axle propulsion. In such an axle-split hybrid vehicle employing an engine and an electric motor, an electric motor may be integrated into a particular drive-axle, thus forming an electric drive-unit, and be capable of propelling the vehicle while the engine is shut off.

Each powered axle typically includes a final drive assembly with a differential that allows opposite side, i.e., left and right side, driven wheels to rotate at different speeds when the vehicle negotiates a turn. Specifically, the differential permits the driven wheel that is traveling around the outside of the turning curve to roll farther and faster than the driven wheel traveling around the inside of the turning curve, while approximately equal torque is applied to each of the driven wheels. An increase in the speed of one driven wheel is balanced by a decrease in the speed of the other driven wheel, while the average speed of the two driven wheels equals the input rotational speed of the drive shaft connecting the power-source to the differential.

SUMMARY

An electric drive-unit encased in a drive-unit housing is configured to selectively provide first and second speed-ratios. The electric drive-unit includes an electric motor configured to generate an electric motor torque. The electric drive-unit also includes a first output member and a second output member. The electric drive-unit also includes a first planetary gear-set having first, second, and third nodes, and having one node directly connected to the electric motor. The electric drive-unit additionally includes a second planetary gear-set having first, second, and third nodes. The second planetary gear-set has one node directly connected to the first planetary gear-set, another node directly connected to the first output member, and the remaining node fixed to the drive-unit housing.

The electric drive-unit also includes a third planetary gear-set having first, second, and third nodes. The third planetary gear-set has one node directly connected to the first planetary gear-set and another node directly connected to the second output member. The electric drive-unit additionally includes a first torque-transmitting device configured to selectively connect one of the nodes of the third planetary gear-set to the drive-unit housing to thereby affect the first speed-ratio. Furthermore, the electric drive-unit includes a second torque-transmitting device configured to selectively connect one of the nodes of the first planetary gear-set to one of the nodes of the third planetary gear-set to thereby affect a second speed-ratio.

The third node of the first planetary gear-set may be either directly or operatively connected to the electric motor.

The third node of the second planetary gear-set may be directly connected to the first node of the first planetary gear-set.

The first node of the second planetary gear-set may be directly connected to the first output member, and the second node of the second planetary gear-set may be fixed to the drive-unit housing.

The first node of the third planetary gear-set may be directly connected to the second node of the first planetary gear-set.

The second node of the third planetary gear-set may be directly connected to the second output member.

The first torque-transmitting device may be configured to selectively connect the third node of the third planetary gear-set to the drive-unit housing.

The second torque-transmitting device may be configured to selectively connect the third node of the first planetary gear-set to the third node of the third planetary gear-set.

The electric drive-unit may additionally include a third torque-transmitting device. The third torque-transmitting device may be configured to selectively connect the second node of the first planetary gear-set to the housing.

Additionally, spacing of the first, second, and third nodes of each of the first, second, and third planetary gear-sets may be selected to produce zero speed across the third torque-transmitting device whenever rotational speeds of the first output member and the second output member are equal. In such an embodiment, the third torque-transmitting device may thereby be employed to provide an electronic limited slip differential (eLSD) in the second speed-ratio.

The electric drive-unit may further include a fourth torque-transmitting device. The fourth torque-transmitting device may be configured to selectively connect the first output member and the second output member and thereby provide an electronic limited slip differential (eLSD) in each of the first and second speed-ratios.

In each of the first, second, and third planetary gear-sets, the first node may be a ring gear, the second node may be a planetary carrier, and the third node may be a sun gear.

A motor vehicle employing such an electric drive-unit is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
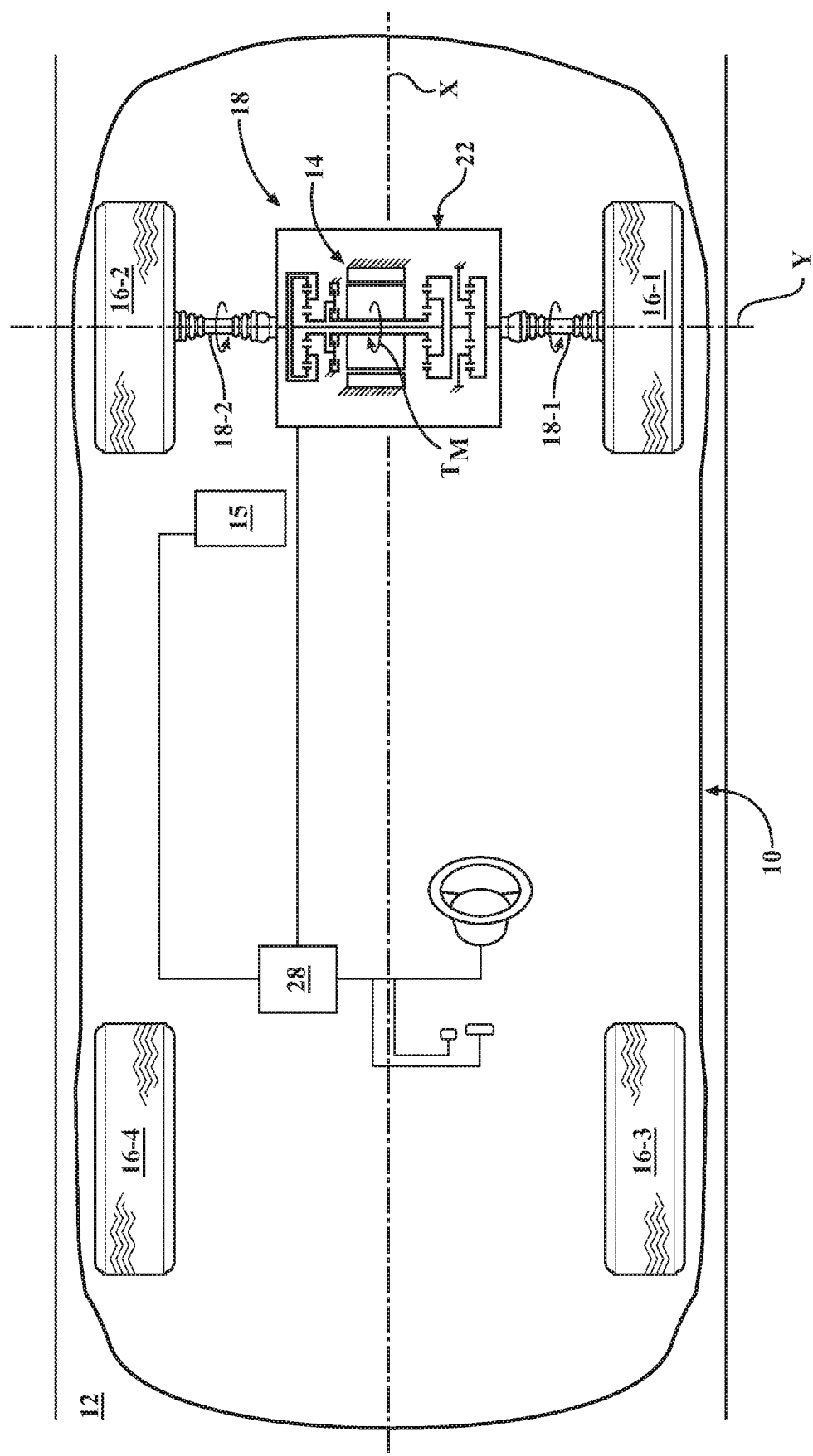
FIG. 1 is a schematic illustration of a motor vehicle having an electric drive-axle employing a two-speed electric drive-unit, according to the disclosure.

Referring to the drawings in which like elements are identified with identical numerals throughout, FIG. 1 illustrates a wheeled motor vehicle 10. The vehicle 10 may be a hybrid-electric or a battery-electric vehicle (BEV). The vehicle 10 may be, but is not limited to, a commercial vehicle, industrial vehicle, passenger vehicle, train or the like. As shown, the vehicle 10 generally includes one or more power-sources for propulsion of the vehicle 10 down a road surface 12. As may be seen in FIG. 1, the vehicle 10 is generally arranged along a longitudinal vehicle axis X.

As shown, the vehicle includes an electric motor 14, to be discussed in greater detail below, configured to generate an electric motor torque $T_M$. The vehicle 10 also includes left-side rear or first road wheel 16-1 and the right-side rear or second rear road wheel 16-2, and respective left- and right-side front road wheels 16-3 and 16-4. As shown, the electric motor 14 is configured to drive the vehicle's respective left- and right-side rear road wheels 16-1 and 16-2. The electric motor 14 receives its electrical energy from an energy storage device 15. Although not shown, the electric motor 14 may alternatively be configured to drive the vehicle's respective left- and right-side front road wheels 16-3 and 16-4. The specific road wheels 16-1, 16-2 or 16-3, 16-4 receiving torque from the electric motor 14 to power the vehicle 10 down the road surface 12 may be defined as "drive" wheels.

Figures 2, 3:
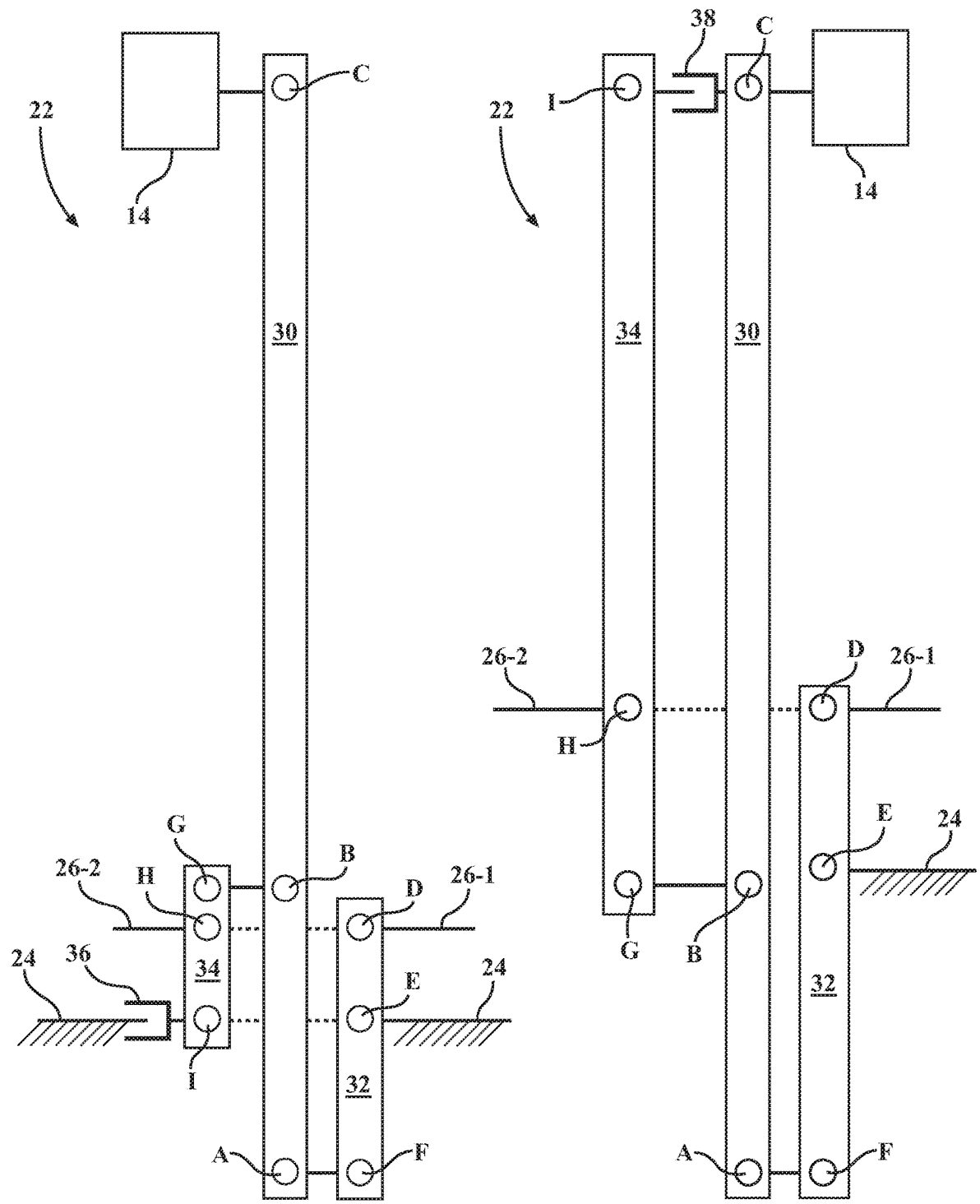
FIG. 2 is a schematic lever diagram illustration of one embodiment of the two-speed electric drive-unit shown in FIG. 1, depicted operating in a first speed-ratio.
FIG. 3 is a schematic lever diagram illustration of one embodiment of the two-speed electric drive-unit shown in FIG. 1, depicted operating in a second speed-ratio.

As shown, the rear road wheels 16-1 and 16-2 are operatively connected by a rear drive-axle 18 having first and second axle-shafts 18-1, 18-2 generally arranged along a transverse axis Y. The electric motor 14 includes a stator 14-1 and a rotor 14-2. The stator 14-1 receives electrical energy from an energy storage device 15, while the rotor 14-2 imparts the electric motor torque $T_M$. The rear drive-axle 18 also includes an electric drive-unit 22 encased in a drive-unit housing 24. As shown in FIG. 2, the electric drive-unit 22 includes the electric motor 14, and is configured to power the first road wheel 16-1 and the second rear road wheel 16-2. The drive-unit 22 is configured to selectively provide first and second speed-ratios during operation of the vehicle 10. The drive-unit 22 includes a first output member 26-1 connected to the first road wheel 16-1 via the first axle-shaft 18-1 and a second output member 26-2 connected to the second road wheel 16-2 via the second axle-shaft 18-2.

As shown in FIG. 1, the vehicle 10 may also include a programmable controller 28 configured, i.e., constructed and programmed, to regulate operation of the electric drive-unit 22 in response to command(s) from an operator of the subject vehicle as the vehicle traverses the road surface 12. Specifically, the controller 28 may be programmed to appropriately transmit electric motor torque $T_M$ to the road wheels 16-1, 16-2. To accomplish the above, the controller 28 may include a processor and tangible, non-transitory memory, which includes instructions for operation of the electric drive-unit 22 programmed therein. The memory may be a recordable medium that participates in providing computer-readable data or process instructions. Such a recordable medium may take many forms, including but not limited to non-volatile media and volatile media.

Non-volatile media for the controller 28 may include, for example, optical or magnetic disks and other persistent memory. Volatile media may include, for example, dynamic random access memory (DRAM), which may constitute a main memory. Appropriate instructions may be transmitted by one or more transmission medium, including coaxial cables, copper wire and fiber optics, including the wires that comprise a system bus coupled to a processor of a computer. Memory of the controller 28 may also include a flexible disk, hard disk, magnetic tape, another magnetic medium, a CD-ROM, DVD, another optical medium, etc. The controller 28 may be configured or equipped with other required computer hardware, such as a high-speed clock, requisite Analog-to-Digital (A/D) and/or Digital-to-Analog (D/A) circuitry, input/output circuitry and devices (I/O), as well as appropriate signal conditioning and/or buffer circuitry. Algorithms required by the controller 28 or accessible thereby may be stored in the memory and automatically executed to provide the required functionality of the vehicle 10 and the electric drive-unit 22.

Specific embodiments of the electric drive-unit 22 are represented in lever diagram form in FIGS. 2-5. A lever diagram is a schematic representation of the components of a mechanical device such as an automatic transmission. Each individual lever represents a planetary gear-set or an external gear-set. In the planetary gear-set levers, the three basic mechanical components of the planetary gear are each represented by a node. Therefore, a single planetary gear-set lever contains three nodes: one for the sun gear member, one for the planet gear carrier member, and one for the ring gear member. The relative length between the nodes of each planetary gear-set lever may be used to represent the ring-to-sun member ratio of each respective gear-set. These lever ratios, in turn, are used to vary the gear ratios of the transmission in order to achieve appropriate ratios and ratio progression. Mechanical couplings or interconnections between the nodes of the various planetary gear-sets are illustrated by thin, solid lines and torque-transmitting devices such as clutches and brakes are presented as interleaved fingers. If the subject torque-transmitting device is a brake, one set of the fingers is grounded. Further explanation of the format, purpose and use of lever diagrams may be found in SAE Paper 810102, authored by Benford, Howard and Leising, Maurice, "The Lever Analogy: A New Tool in Transmission Analysis", 1981, which is hereby fully incorporated by reference.

As shown in FIGS. 2-5, the drive-unit 22 is also includes a first planetary gear-set 30, a second planetary gear-set 32, and a third planetary gear-set 34. The first planetary gear-set 30 has a first node A, a second node B, and a third node C. As shown, one of the nodes A, B, and C is directly connected to the electric motor 14. The second planetary gear-set 32 has a first node D, a second node E, and a third node F. As shown, one of the nodes D, E, F is directly connected to the first planetary gear-set 30. Additionally, another node of the nodes D, E, F is directly connected to the first output member 26-1, while the remaining node is fixed to the drive-unit housing 24. The third planetary gear-set 34 has a first node G, a second node H, and a third node I. As shown, one of the nodes G, H, I is directly connected to the first planetary gear-set 30, and another node of the nodes G, H, I is directly connected to the second output member 26-2. The expression "directly connected" herein expressly denotes a direct mechanical connection between components of the drive-unit 22, without an intervening selective disconnect, such as via a torque-transmitting device.

The drive-unit 22 additionally includes a first torque-transmitting device 36 configured as a first brake to selectively connect one of the nodes G, H, I of the third planetary gear-set 34 to the drive-unit housing 24. Actuation of the first torque-transmitting device 36 is configured to affect the first speed-ratio of the drive-unit 22, which is specifically depicted in the lever diagram shown in FIG. 2. The drive-unit 22 further includes a second torque-transmitting device 38 configured as a first clutch to selectively connect one of the nodes A, B, and C of the first planetary gear-set 30 to one of the nodes G, H, I of the third planetary gear-set 34. Actuation of the second torque-transmitting device 38 is configured to affect the second speed-ratio of the drive-unit 22, which is specifically depicted in the lever diagram shown in FIGS. 3 and 4.

Specifically, as shown in FIGS. 2-5, the third node C of the first planetary gear-set 30 may be directly connected to the rotor 14-2 of electric motor 14. The third node of the second planetary gear-set 32 may be directly connected to the first node A of the first planetary gear-set 30. The first node D of the second planetary gear-set 32 may be directly connected to the first output member 26-1. As such, the second node E of the second planetary gear-set 32 may be fixed to the drive-unit housing 24. The first node G of the third planetary gear-set 34 may be directly connected, i.e., for continuous synchronous rotation, to the second node B of the first planetary gear-set 30. Furthermore, the second node H of the third planetary gear-set 34 may be directly connected to the second output member 26-2.

The ratios of the first, second, and third planetary gear-sets 30, 32, 34, i.e., the respective ring-to-sun member ratios, are selected to provide a fixed even (50/50) torque distribution between the first output member 26-1 and the second output member 26-2 in each of the first and second gears. In the embodiments of the drive-unit 22 shown in FIGS. 2, 3, and 5 disclosed herein, the 50/50 torque split in the drive-unit 22 is achieved by freely selecting ring-to-sun member ratios (R1, R2, R3 for the planetary gear-sets 30, 32, 34, respectively) in two of the three planetary gear-sets 30, 32, 34, and then setting the ring-to-sun member ratio of the third planetary gear-set according to the following equation:

$$R3=-(R1+1)/(R1-R1{\times}R2+1) \qquad \text{Eq. \#1}$$

Figure 4:
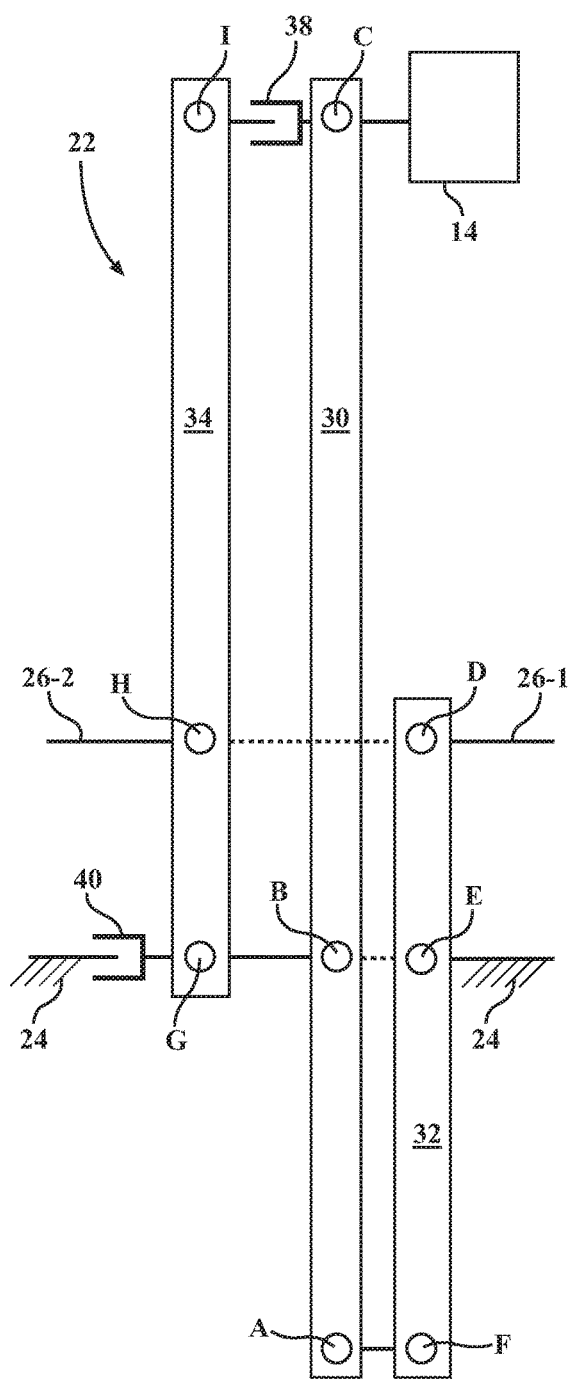
FIG. 4 is a schematic lever diagram illustration of the embodiment of the two-speed electric drive-unit shown in FIG. 1, depicted with an electronic limited slip differential (eLSD) operating in a second speed-ratio.

The embodiment of the drive-unit 22 depicted in FIG. 4 includes a separate set of constraints. Similar to the embodiments of FIGS. 2, 3, and 5, the embodiment of FIG. 4 provides a fixed 50/50 torque distribution between the first output member 26-1 and the second output member 26-2 in each of the first and second gears. The above requirement for the embodiment of FIG. 4 may be satisfied by freely selecting ring-to-sun member ratios in two of the three planetary gear-sets 30, 32, 34, and then setting the ring-to-sun member ratio of the third planetary gear-set according to the equation Eq. #1.

The ring-to-sun member ratios in the embodiment of FIG. 4 must additionally produce zero speed across a torque-transmitting device configured to selectively connect the first node G of the third planetary gear-set 34 to the housing 24 (to be discussed below) when the first output member 26-1 and the second output member 26-2 rotational speeds are equal. The above requirement may be satisfied by freely selecting ring-to-sun member ratios in two of the three planetary gear-sets 30, 32, 34, and then setting the ring-to-sun member ratio of the third planetary gear-set according to the following equation:

$$R3=R1{\times}R2-1 \qquad \text{Eq. \#2}$$

However, Eq. #2 will not also produce a 50% torque split unless Eq. #1 is also satisfied. Consequently, the ring-to-sun member ratio may only be selected in one of the three planetary gear-sets 30, 32, 34, either R1, R2, or R3, and then the ring-to-sun member ratio of the remaining two planetary gear-sets needs to be selected to satisfy both of the following equations:

$$R2=2/R1+1 \qquad \text{Eq. \#3}$$

$$R3=R1+1 \qquad \text{Eq. \#4}$$

As shown in FIG. 2, in the first speed-ratio of the drive-unit 22, the first torque-transmitting device 36 may be configured, i.e., constructed, arranged, and operated, to selectively connect the third node I of the third planetary gear-set 34 to the drive-unit housing 24. As shown in FIGS. 3 and 4, in the second speed-ratio of the drive-unit 22, the second torque-transmitting device 38 may be configured to selectively connect the third node C of the first planetary gear-set 30 to the third node I of the third planetary gear-set 34. As shown in FIG. 4, the drive-unit 22 may additionally include a third torque-transmitting device 40 configured as a second brake to selectively connect the first node G of the third planetary gear-set 34 to the housing 24. Additionally, the third torque-transmitting device 40 may be configured to selectively connect the second node B of the first planetary gear-set 30, since node B is directly connected to node G.

Figure 5:
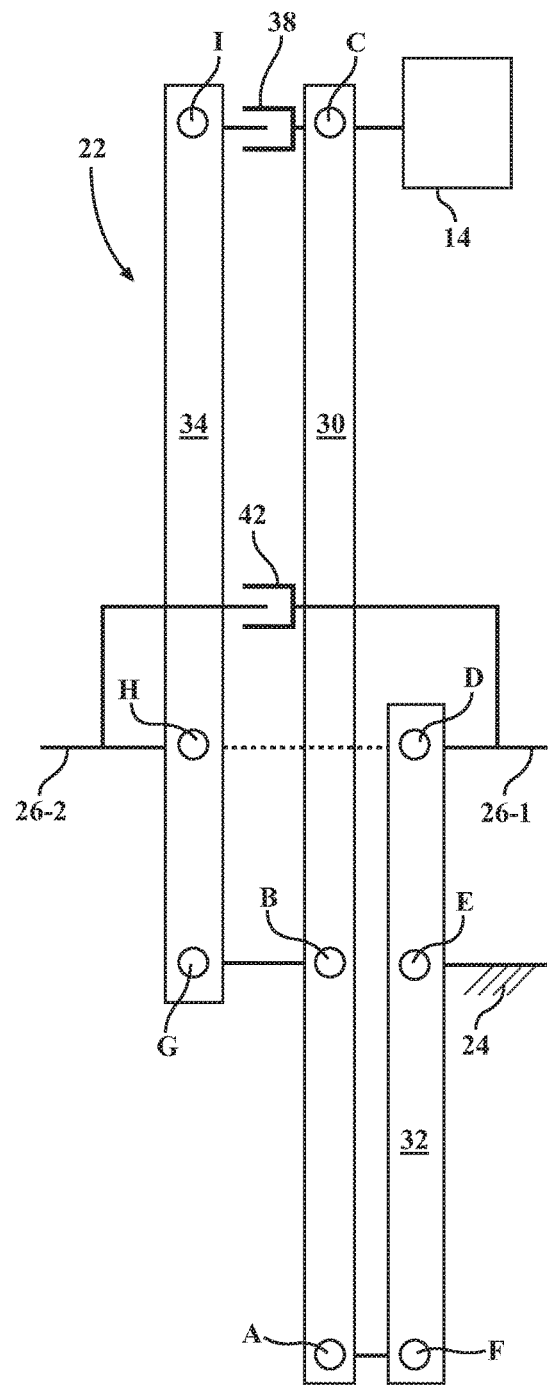
FIG. 5 is a schematic lever diagram illustration of another embodiment of the two-speed electric drive-unit shown in FIG. 1, depicted with an eLSD in each of the first and second speed-ratios

In the embodiment of the drive-unit 22 shown in FIG. 4, spacing of the first, second, and third nodes of each of the first, second, and third planetary gear-sets 30, 32, 34, i.e., the relative length between the nodes of each planetary gear-set 30, 32, 42 lever and the respective ring-to-sun member ratios, may be selected to produce zero speed across the third torque-transmitting device 40 whenever rotational speeds of the first output member 26-1 and the second output member 26-2 are equal. The lever diagram depicted in FIG. 4, along with the noted selection of gear-set node spacing, enables actuation of the third torque-transmitting device 40 to provide the drive-unit 22 with an electronic limited slip differential (eLSD) in the second speed-ratio. Also, as shown in FIG. 5, the drive-unit 22 may include a fourth torque-transmitting device 42 configured as a rotating second clutch to selectively connect the first output member 26-1 and the second output member 26-2. The fourth torque-transmitting device 42 may be employed in place of the third torque-transmitting device 40 and actuated to provide the drive-unit 22 with an electronic limited slip differential (eLSD) in each of the first and second speed-ratios.

In each of the first, second, and third planetary gear-sets, 30, 32, 34, the respective first, second, and third nodes may be defined by analogous planetary gear-set elements or members. Specifically, each of the first nodes A, D, G may be respective ring gears 30-1, 32-1, 34-1. Additionally, the second nodes B, E, H may be respective planetary carriers 30-2, 32-2, 34-2, each configured to support a respective set of pinion gears, which will be described in greater detail below. Furthermore, the third nodes C, F, I may be respective sun gears 30-3, 32-3, 34-3. Each set of pinion gears meshingly engages one of the ring gear members 30-1, 32-1, 34-1 with the respective sun gear member 30-3, 32-3, 34-3.

Figure 6:
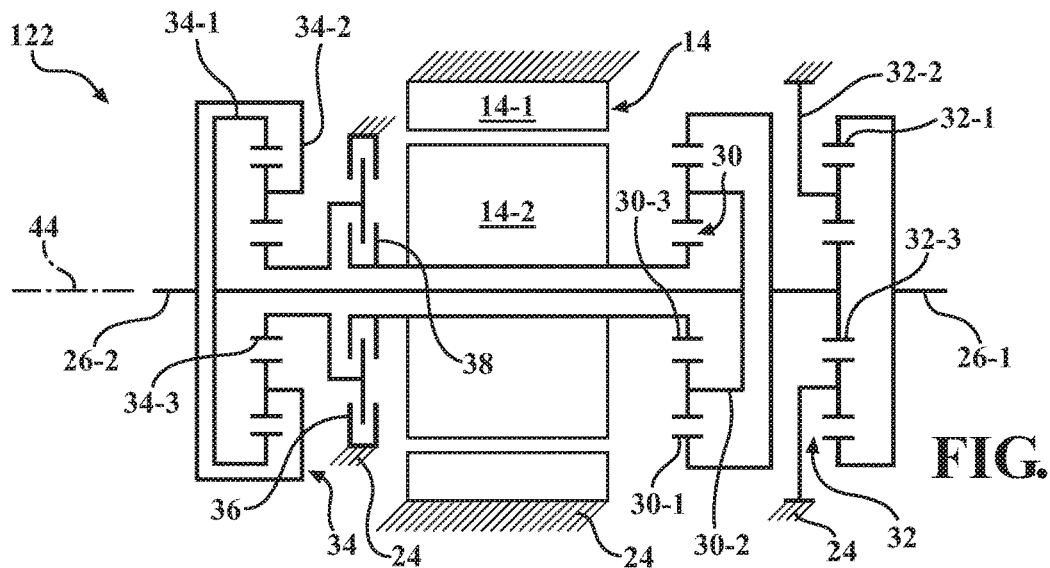
FIG. 6 is an exemplary schematic stick diagram illustration of the two-speed electric drive-unit corresponding to the lever diagrams of FIGS. 1 and 2.
Figure 7:
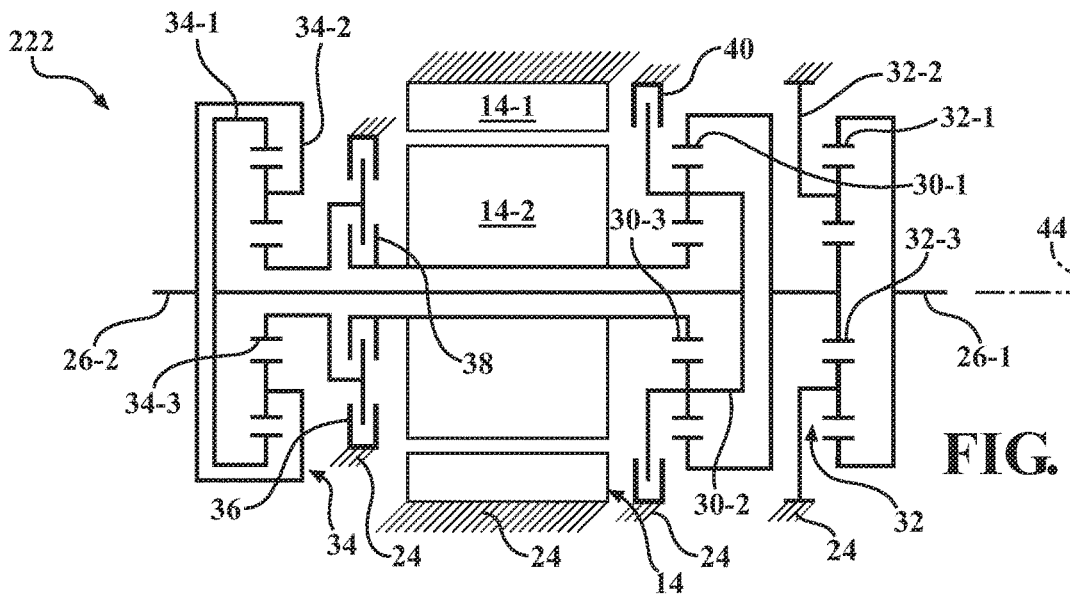
FIG. 7 is an exemplary schematic stick diagram illustration of the two-speed electric drive-unit corresponding to the lever diagram of FIG. 4.
Figure 8:
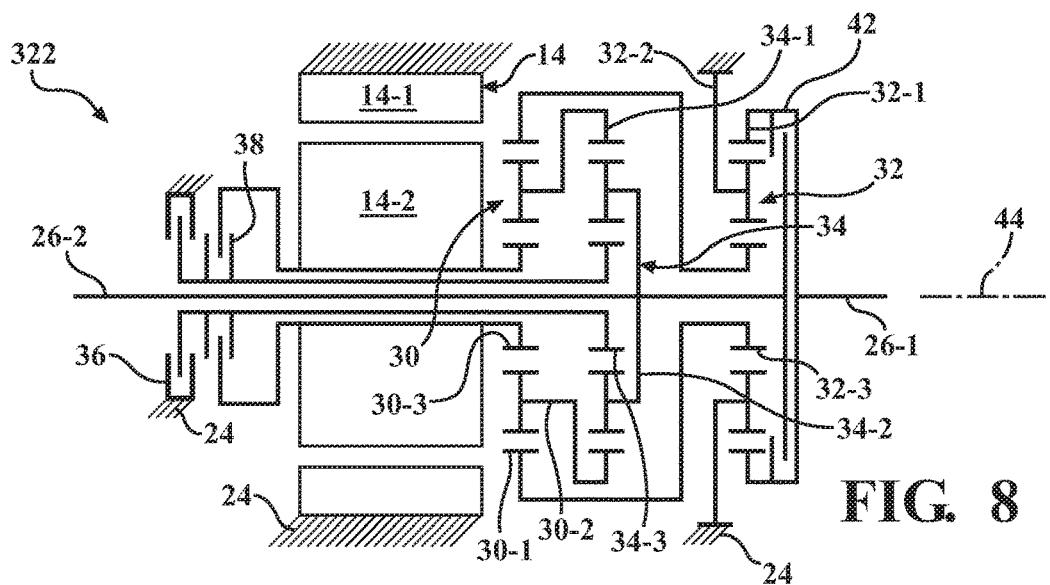
FIG. 8 is an exemplary schematic stick diagram illustration of the two-speed electric drive-unit corresponding to the lever diagram of FIG. 5.

In FIG. 6, the drive-unit 22 is represented by a schematic stick diagram that depicts specific planetary gear-set connections corresponding to and reflected by the lever diagrams of FIGS. 2-3. In FIG. 7, the drive-unit 22 is represented by a schematic stick diagram that depicts specific planetary gear-set connections corresponding to and reflected by the lever diagrams of FIG. 4. In FIG. 8, the drive-unit 22 is represented by a schematic stick diagram that depicts specific planetary gear-set connections corresponding to and reflected by the lever diagrams of FIG. 5. The exemplary embodiment of the drive-unit 22 represented by the lever diagrams in FIGS. 2-3 is identified in FIG. 6 with a numeral 122, and depicts the drive-unit without eLSD. In the exemplary embodiment of the drive-unit 22 represented by the lever diagram in FIG. 4 is identified in FIG. 7 with a numeral 222, and depicts the drive-unit with eLSD in second speed-ratio. In the exemplary embodiment of the drive-unit 22 represented by the lever diagram in FIG. 5 is identified in FIG. 8 with a numeral 322, and depicts the drive-unit with eLSD in each of first and second speed-ratios.

In each of the exemplary embodiments of the drive-unit 22 shown in the stick diagrams of FIGS. 6-8, the drive-unit includes specific embodiments of the first planetary gear-set 30, the second planetary gear-set 32, and the third planetary gear-set 34. As shown, each exemplary embodiment of the drive-unit 22 shown in FIGS. 6-8 may be arranged along a central gear-set axis 44, which may coincide with the second axis Y. Furthermore, the first planetary gear-set 30 employs the sun gear member 30-3 which is circumscribed by the ring gear member 30-1, and the carrier member 30-2 rotatably supporting a plurality of pinion gears that meshingly engage both the sun gear member 30-3 and the ring gear member 30-1. The second planetary gear-set 32 employs the sun gear member 32-3 which is circumscribed by the ring gear member 32-1, and the carrier member 32-2 rotatably supporting a set of pinion gears that meshingly engages the sun gear member 32-3 and the ring gear member 32-1. The third planetary gear-set 34 employs the sun gear member 34-3 which is circumscribed by the ring gear member 34-1, and the carrier member 34-2 rotatably supporting a set of pinion gears that meshingly engages the sun gear member 34-3 and the ring gear member 34-1.

In each of the exemplary embodiments of the drive-unit 22 shown in the stick diagrams of FIGS. 6-8, the respective drive-units 122, 222, and 322 include specific embodiments of the first torque-transmitting device 36 configured to selectively connect the sun gear member 34-3 to the drive-unit housing 24. Additionally, as shown in the stick diagrams of FIG. 6-8, the respective drive-units 122, 222, and 322 include specific embodiments of the second torque-transmitting device 38 configured to selectively connect the sun gear member 30-3 to the sun gear member 34-3. In the exemplary embodiment of the drive-unit 22 shown in the stick diagram of FIG. 7, the drive-unit 222 additionally includes a specific embodiment of the third torque-transmitting device 40 operating as a brake and configured to selectively connect the carrier member 30-2 to the drive-unit housing 24.

Figure 9:
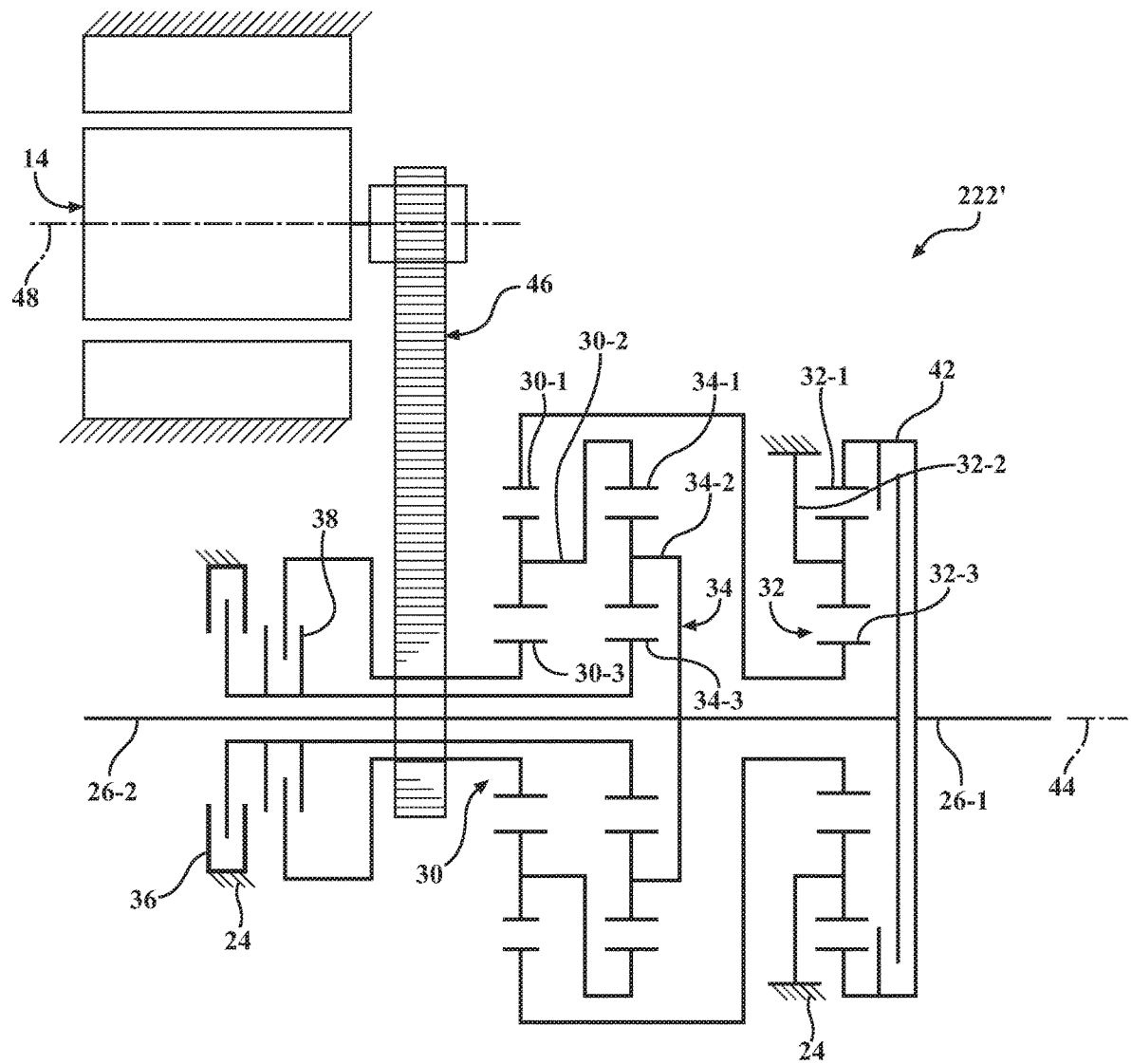
FIG. 9 is an exemplary alternative schematic stick diagram illustration of the two-speed electric drive-unit employing a transfer mechanism and corresponding to the lever diagram of FIG. 5.

In the exemplary embodiment of the drive-unit 22 shown in the stick diagram of FIG. 8, the drive-unit 322 additionally includes a specific embodiment of the fourth torque-transmitting device 42 operating as a rotating clutch and configured to selectively connect the first output member 26-1 and the second output member 26-2. Additionally, FIG. 9 depicts an alternative exemplary embodiment of the drive-unit 322 shown in the stick diagram of FIG. 7, and is labeled with numeral 222'. The drive-unit 222' includes a transfer mechanism 46, such as a chain or a gear-set operative connection between the electric motor 14 and the sun gear member 30-3. Although not shown, the transfer mechanism 46 may also be employed as an operative connection between the electric motor 14 and the sun gear member 30-3 in a respective alternative embodiment of each of the drive-units 122 and 322. Accordingly, as shown, the drive-unit 222' permits the electric motor 14 to be arranged on a motor axis 48 parallel to the central gear-set axis 44 and be operatively connected to the planetary gear-sets 30, 32, 34.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An electric drive-unit encased in a drive-unit housing and configured to selectively provide first and second speed-ratios, the electric drive-unit comprising:
   an electric motor configured to generate an electric motor torque;
   a first output member and a second output member;
   a first planetary gear-set having first, second, and third nodes, wherein one of the first, second, and third nodes of the first gear-set is directly connected to the electric motor;
   a second planetary gear-set having first, second, and third nodes, wherein one of the first, second, and third nodes of the second gear-set is directly connected to the first planetary gear-set, another of the first, second, and third nodes of the second gear-set is directly connected to the first output member, and the remaining of the first, second, and third nodes of the second gear-set is node fixed to the drive-unit housing;
   a third planetary gear-set having first, second, and third nodes, wherein one of the first, second, and third nodes of the third gear-set is directly connected to the first planetary gear-set and another of the first, second, and third nodes of the second gear-set is directly connected to the second output member;

a first torque-transmitting device configured to selectively connect one of the nodes of the third planetary gear-set to the drive-unit housing to thereby affect the first speed-ratio; and a second torque-transmitting device configured to selectively connect one of the nodes of the first planetary gear-set to one of the nodes of the third planetary gear-set to thereby affect the second speed-ratio.

2. The electric drive-unit according to claim 1, wherein the third node of the first planetary gear-set is operatively connected to the electric motor.

3. The electric drive-unit according to claim 1, wherein:
the third node of the second planetary gear-set is directly connected to the first node of the first planetary gear-set; and
the first node of the second planetary gear-set is directly connected to the first output member.

4. The electric drive-unit according to claim 1, wherein the first node of the third planetary gear-set is directly connected to the second node of the first planetary gear-set.

5. The electric drive-unit according to claim 1, wherein the second node of the third planetary gear-set is directly connected to the second output member.

6. The electric drive-unit according to claim 1, wherein the first torque-transmitting device is configured to selectively connect the third node of the third planetary gear-set to the drive-unit housing.

7. The electric drive-unit according to claim 1, wherein the second torque-transmitting device is configured to selectively connect the third node of the first planetary gear-set to the third node of the third planetary gear-set.

8. The electric drive-unit according to claim 1, further comprising a third torque-transmitting device, wherein the third torque-transmitting device is configured to selectively connect the second node of the first planetary gear-set to the housing, and wherein spacing of the first, second, and third nodes of each of the first, second, and third planetary gear-sets is selected to produce zero speed across the third torque-transmitting device whenever rotational speeds of the first output member and the second output member are equal, to thereby provide an electronic limited slip differential (eLSD) in the second speed-ratio.

9. The electric drive-unit according to claim 1, further comprising a fourth torque-transmitting device, wherein the fourth torque-transmitting device is configured to selectively connect the first output member and the second output member, to thereby provide an electronic limited slip differential (eLSD) in each of the first and second speed-ratios.

10. The electric drive-unit according to claim 1, wherein in each of the first, second, and third planetary gear-sets, the first node is a ring gear, the second node is a planetary carrier, and the third node is a sun gear.

11. A motor vehicle comprising:
a first road wheel and a second road wheel;
an electric drive-unit encased in a drive-unit housing and configured to power the first and second road wheels, the drive-unit including:
an electric motor configured to generate an electric motor torque;
a first output member connected to the first road wheel and a second output member connected to the second road wheel;
a first planetary gear-set having first, second, and third nodes, wherein one of the first, second, and third nodes of the first gear-set is directly connected to the electric motor;
a second planetary gear-set having first, second, and third nodes, wherein one of the first, second, and third nodes of the second gear-set is directly connected to the first planetary gear-set, another of the first, second, and third nodes of the second gear-set is directly connected to the first output member, and the remaining of the first, second, and third nodes of the second gear-set is node fixed to the drive-unit housing;
a third planetary gear-set having first, second, and third nodes, wherein one of the first, second, and third nodes of the third gear-set is directly connected to the first planetary gear-set and another of the first, second, and third nodes of the second gear-set is directly connected to the second output member;
a first torque-transmitting device configured to selectively connect one of the nodes of the third planetary gear-set to the drive-unit housing to thereby affect the first speed-ratio; and
a second torque-transmitting device configured to selectively connect one of the nodes of the first planetary gear-set to one of the nodes of the third planetary gear-set to thereby affect the second speed-ratio.

12. The motor vehicle according to claim 11, wherein the third node of the first planetary gear-set is operatively connected to the electric motor.

13. The motor vehicle according to claim 11, wherein:
the third node of the second planetary gear-set is directly connected to the first node of the first planetary gear-set; and
the first node of the second planetary gear-set is directly connected to the first output member.

14. The motor vehicle according to claim 11, wherein the first node of the third planetary gear-set is directly connected to the second node of the first planetary gear-set.

15. The motor vehicle according to claim 11, wherein the second node of the third planetary gear-set is directly connected to the second output member.

16. The motor vehicle according to claim 11, wherein the first torque-transmitting device is configured to selectively connect the third node of the third planetary gear-set to the drive-unit housing.

17. The motor vehicle according to claim 11, wherein the second torque-transmitting device is configured to selectively connect the third node of the first planetary gear-set to the third node of the third planetary gear-set.

18. The motor vehicle according to claim 11, wherein the electric drive-unit additionally includes a third torque-transmitting device configured to selectively connect the second node of the first planetary gear-set to the housing, and wherein spacing of the first, second, and third nodes of each of the first, second, and third planetary gear-sets is selected to produce zero speed across the third torque-transmitting device whenever rotational speeds of the first output member and the second output member are equal, to thereby provide an electronic limited slip differential (eLSD) in the second speed-ratio.

19. The motor vehicle according to claim 11, wherein the electric drive-unit additionally includes a fourth torque-transmitting device configured to selectively connect the first output member and the second output member, to thereby provide an electronic limited slip differential (eLSD) in each of the first and second speed-ratios.

20. The motor vehicle according to claim 11, wherein in each of the first, second, and third planetary gear-sets, the first node is a ring gear, the second node is a planetary carrier, and the third node is a sun gear.

* * * * *